US009094438B2

(12) United States Patent
Shatsky (10) Patent No.: US 9,094,438 B2
(45) Date of Patent: Jul. 28, 2015

(54) USING NON-IMS CONNECTIONS IN IMS SESSIONS (75) Inventor: Alexander Shatsky, Vaughan (CA)

(73) Assignee: BlackBerry Limited, Waterloo, Ontario (CA)

(*) Notice: Subject to any disclaimer, the term of this patent is extended or adjusted under 35 U.S.C. 154(b) by 292 days.

(21) Appl. No.: 13/555,403

(22) Filed: Jul. 23, 2012

(65) Prior Publication Data

US 2013/0021998 A1 Jan. 24, 2013

Related U.S. Application Data (63) Continuation of application No. PCT/CA2011/050450, filed on Jul. 22, 2011.

(51) Int. Cl.
H04L 29/08 (2006.01)
H04W 52/02 (2009.01)
H04L 29/06 (2006.01)
H04W 28/26 (2009.01)

(52) U.S. Cl.
CPC .......... *H04L 67/141* (2013.01); *H04L 65/103* (2013.01); *H04L 65/104* (2013.01); *H04L 65/1016* (2013.01); *H04L 65/1069* (2013.01); *H04W 52/0209* (2013.01); *H04W 28/26* (2013.01)

(58) Field of Classification Search
CPC .. H04L 65/102; H04L 29/06068; H04L 12/56
USPC .......... 370/352, 466, 474, 389; 709/227, 229; 455/412.1
See application file for complete search history.

(56) References Cited

U.S. PATENT DOCUMENTS

| 8,572,261 | B2* | 10/2013 | Åstrom et al. ............... 709/227 |
| 8,798,253 | B2* | 8/2014 | Allen et al. ............... 379/265.01 |
| 2006/0291488 | A1 | 12/2006 | Naqvi et al. |
| 2008/0181253 | A1 | 7/2008 | Maes |
| 2009/0017796 | A1 | 1/2009 | Foti |
| 2011/0029654 | A1 | 2/2011 | Takeda et al. |

OTHER PUBLICATIONS

International Search Report and Written Opinion of International Application No. PCT/CA2011/050450; dated Apr. 20, 2012; 10 pages.
Hautakorpi et al., "Interconnecting P2PSIP and IMS", Proceedings of the Second International Conference on Next Generation Mobile Applications, Services, and Technologies, pp. 83-87, Sep. 2008.

(Continued)

Primary Examiner — Chandrahas Patel
(74) Attorney, Agent, or Firm — Fish & Richardson P.C.

(57) ABSTRACT

Systems and methods can be implemented for IP multimedia subsystem (IMS) resource reservation. A first electronic device can transmit, through an IP network, a non-Session Initiation Protocol (SIP) message to an application server in an IMS network, where the non-IMS SIP message includes a request to initiate an IMS communication session through the IMS network with a second electronic device. A SIP message can also be transmitted through the IMS network to the application server that initiates a SIP INVITE session between the first electronic device and the application server, where the SIP INVITE session is routed through the IMS network. The first electronic device can then, receive a SIP response message that identifies a resource reservation for the IMS communication session from the application server.

13 Claims, 6 Drawing Sheets (56) References Cited

OTHER PUBLICATIONS

3GPP TR 24.930 V10.0.0, Signalling Flows for the Session Setup in the IP Multimedia Core Network Subsystem (IMS) based on Session Initiation Protocol (SIP) and Session Description Protocol (SDP); Stage 3 (Release 10); Mar. 2011.

Khan et al., "Experiences with Blending HTTP, RTSP, and IMS", IEEE Communications Magazine, Mar. 2007, pp. 122-128, Mar. 2007.

"3GPP TS 23.203 V11.6.0 (Jun. 2012)3rd Generation Partnership Project; Technical Specification Group Services and System Aspects; Policy and charging control architecture(Release 11)".

3GPP TS 23.228 V11.5.0 (Jun. 2012) 3rd Generation Partnership Project; Technical Specification Group Services and System Aspects; IP Multimedia Subsystem (IMS); Stage 2 (Release 11).

3GPP TS 29.214 V7.11.0 (Dec. 2010); 3rd Generation Partnership Project; Technical Specification Group Core Network and Terminals; Policy and Charging Control over Rx reference point (Release 7).

3GPP TS 24.228 V5.15.0. Signalling flows for the IP multimedia call control based on Session Initiation Protocol (SIP) and Session Description Protocol (SDP); Stage 3.

"3GPP TS 24.229 V9.4.0 (Jun. 2010)3rd Generation Partnership Project; Technical Specification Group Core Network and Terminals; IP multimedia call control protocol based onSession Initiation Protocol (SIP) and Session Description Protocol (SDP); Stage 3 (Release 9)".

"3GPP TS 26.234 V9.9.0 (Jun. 2012); 3rd Generation Partnership Project; Technical Specification Group Services and System Aspects; Transparent end-to-end Packet-switched Streaming Service (PSS); Protocols and codecs(Release 9)".

3GPP TS 26.237 V10.5.0 (Jun. 2012)3rd Generation Partnership Project; Technical Specification Group Services and System Aspects; IP Multimedia Subsystem (IMS) based Packet Switch Streaming (PSS) and Multimedia Broadcast/Multicast Service (MBMS) User Service; Protocols (Release 10).

Burger et al.; IETF RFC 4483—A Mechanism for Content Indirection in Session Initiation Protocol (SIP) Messages; May 2006.

Campbell et al; IETF RFC 4975—The Message Session Relay Protocol (MSRP); Sep. 2007.

Handley et al; IETF RFC 4566 SDP: Session Description Protocol; Jul. 2006.

Rosenberg et al; IETF RFC 3261 SIP: Session Initiation Protocol; Jun. 2002.

Rosenberg et al; IETF RFC 3264—An Offer/Answer Model with Session Description Protocol; Jun. 2002.

Rosenberg et al; IETF RFC3311—The Session Initiation Protocol (SIP) Update Method; Sep. 2002.

Schulzrinne et al; IETF RFC 2326 Real Time Streaming Protocol (RTSP); Apr. 1998.

Sparks et al; IETF RFC 3420—Internet Media Type message/sipfrag; Nov. 2002.

International Preliminary Report on Patentability issued in International Application No. PCT/CA2011/050450; dated Feb. 6, 2014; 10 pages.

Extended European Search Report issued in European Application No. 11870137.4 on Nov. 17, 2014; 6 page.

3GPP TR 29.962 V6.1.1 (Oct. 2005) 3rd Generation Partnership Project; Technical Specification Group Core Network Signalling Interworkding between the 3GPP Profile of the Session Initiation Protocol (SIP) and Non-3GPP SIP Usage (Release 6); 53 pages".

3GPP TS 23.218 V10.0.0 (Mar. 2011); 3rd Generation Partnership Project; Technical Specification Group Core Network and Terminals; IP Multimedia (IM) Session Handling; IM Call Model; Stage 2 (Release 10); 65 pages.

\* cited by examiner

USING NON-IMS CONNECTIONS IN IMS SESSIONS

CROSS-REFERENCE TO RELATED APPLICATIONS

This application is a continuation of and claims the benefit of PCT Application PCT/CA2011/050450, entitled "Using Non-IMS Connections in IMS Sessions," filed on Jul. 22, 2011, the entire contents of which are hereby incorporated by reference.

TECHNICAL FIELD

This invention relates to wireless communications and, more particularly, to the utilization of non-IMS SIP signaling protocol for IMS session.

BACKGROUND

In Third Generation Partnership Project (3GPP) systems, an internet protocol (IP) multimedia subsystem (IMS) network can provide mobile users with IP multimedia services, such as voice, video and data. Using IMS, a mobile device may transmit and receive multimedia and/or voice packet switched (PS) communications via a base station implementing one or more IMS Functional Components. To implement IMS, networks can rely upon session initiation protocol (SIP) to provide text-based signaling that can be used to communicate between a UE and the IMS Core Network (CN), between the IMS CN and Application Servers, and between various other components of the IMS Network.

In an IMS network, when a caller wishes to establish an IMS communication session with a callee, the caller's mobile device can construct a SIP INVITE request and forward it to the caller's home network via a Proxy-Call Session Control Function (P-CSCF). The P-CSCF can take a snapshot of the Session Description Protocol (SDP) in the INVITE request and routes the request further to the caller's Serving-SCF (S-CSCF). After receiving and validating the request, the S-CSCF retrieves the caller's initial Filter Criteria (iFC) from the Home Subscriber Server (HSS) and executes the service control logic. The execution logic may include, for instance, invocation of IMS Application Servers (ASs) located in the home network. Typically, the S-CSCF does not invoke the IMS AS by itself, but passes control over the service orchestration to a service broker Application Server (AS). In some instances, the service broker AS orchestrates the IMS AS invocations based on the iFC configurations.

Once the IMS AS has processed the SIP INVITE request, the control is returned back to the S-CSCF. The S-CSCF can determine a next hop for the request and forwards the request to the callee's Interrogating-CSCF (I-CSCF). The I-CSCF can locate the home S-CSCF of the callee and sends the request to the S-CSCF through a number of DNS and diameter queries. The IMS AS's invocation in the terminating network is similar to the originating. Further, the S-CSCF forwards the request to the callee's P-CSCF and finally the callee's mobile device receives the request. The response generated by the callee traverses the same path back to the caller. After several forward and back SIP messages, the session establishment procedure is completed.

DESCRIPTION OF DRAWINGS

Like reference symbols in the various drawings indicate like elements.

DETAILED DESCRIPTION

The present disclosure provides for systems, methods, and apparatuses relating to wireless communications and, more particularly, to the utilization of non-IMS SIP signaling protocol for IMS session. In some aspects, a first electronic device (e.g, user equipment (UE), a server, a private branch exchange (PBX), a gateway) can initiate an IP multimedia subsystem (IMS) session initiation protocol (SIP) communication session using a non-"IMS SIP" protocol/connection. Comparing to IMS SIP, which can be a set of 3GPP specifications defining SIP profile in IMS networks, a non-"IMS SIP" can be SIP profile defined outside of 3GPP IMS standardization activities. Furthermore, in some implementations, the IMS SIP messages may be sent by an electronic device inside of IMS networks, while SIP messages may be sent outside of IMS networks. After IMS SIP session initiation, a network resource may be reserved for one or more media services used in the IMS SIP communication session. The IMS SIP session initiation process may start from the first electronic device sending a non-"IMS SIP" message. The non-IMS SIP message may be an indication of a SIP call/session/dialog being initiated by the first electronic device. The non-"IMS SIP" message can be transmitted to the IMS application server directly, through a public IP network. In comparison, a regular SIP INVITE request message for IMS SIP session initiation may be routed through multiple hops including through a Proxy-Call Session Control Function (P-CSCF) and a Serving-CSCF (S-CSCF) of the IMS core network. The non-"IMS SIP" may be any protocol other than an IMS SIP that can deliver the non-"IMS SIP" message to the AS faster than the IMS SIP. For example, the non-"IMS SIP"s that are suitable for the implementations of the disclosure may include Hypertext Transfer Protocol (HTTP), "non-IMS" SIP (as defined by internet engineering task force request for comments (IETF RFCs)), REpresentational State Transfer (REST), Transmission Control Protocol (TCP), P2P protocols, proprietary protocols (e.g., research in motion protocols), or others. The first electronic device may also send a SIP INVITE request to initiate a regular SIP INVITE dialog/call/session. After receiving the non-"IMS SIP" message, the AS can initiate a SIP dialog with IMS core network without having to wait for the SIP INVITE request.

After a SIP INVITE request and a provisional response to the SIP INVITE request have traversed the IMS network among at least the first electronic device, the AS and the second electronic device, the IMS SIP communication session may be initialized and a resource reservation for one or more IMS multi-media services may be completed. The first electronic device may then activate at least one bearer/media associated with the reserved resource. In some aspects, a first electronic device can initiate a bearer/media activation procedure for IMS SIP session using non-"IMS SIP" protocol/connection after a resource reservation procedure described in the previous section has been completed. The bearer activation procedure may start from a first electronic device transmitting a non-"IMS SIP" message, for example, an HTTP UPDATE request, i.e., a message that may include an HTTP header or a header-parameter with e.g., verb "UPDATE" or any other parameter that may be used by the application server to identify an action to be performed on the SIP call leg of a call/dialog/session without departing from the scope of the present disclosure. It is to be understood that besides the header-parameter "UPDATE" (and corresponding SIP UPDATE request/transaction), example parameters suitable for other SIP transactions for the non-"IMS SIP" message may also include "PRACK", "OPTIONS", "BYE", "CANCEL", "INFO", and "MESSAGE". Similar to the IMS SIP session initiation process using non-"IMS SIP" protocol/connection, the HTTP UPDATE message may be transmitted to the application server directly. As such, the time for the HTTP UPDATE message to arrive at the application server may be faster than a regular SIP UPDATE request, which may be delayed by the P-CSCF and S-CSCF before arriving at the AS. The first electronic device may not transmit a separate SIP UPDATE request to the AS for bearer activation, since the network resource has already been reserved. After receiving the HTTP UPDATE request, the AS can send a SIP message/request to IMS core network for bearer/media activation.

Figure 1:
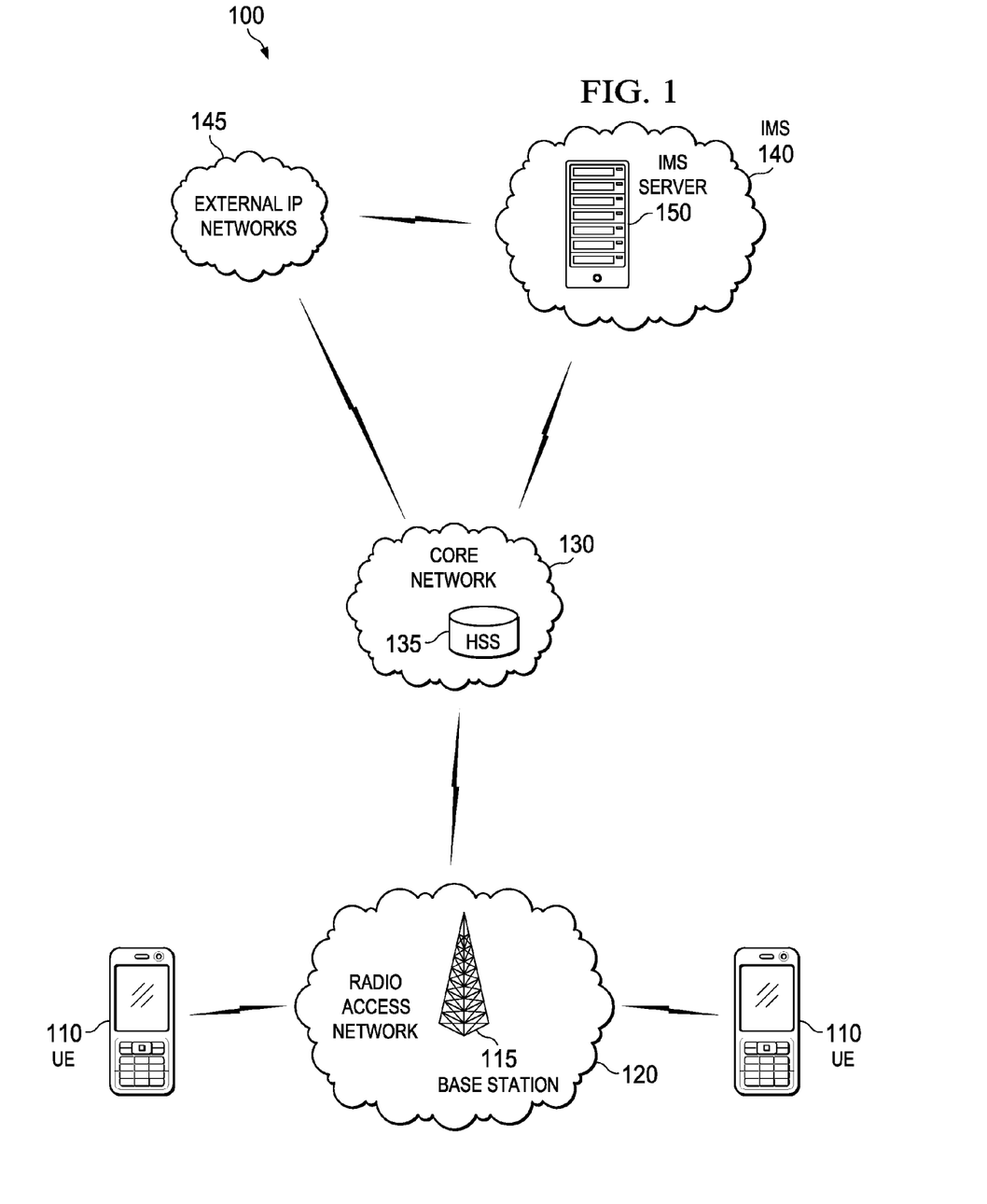
FIG. 1 is a schematic representation of an example wireless cellular communication system.

The electronic devices described above may operate in a cellular communication system 100, such as the example system shown in FIG. 1. The example cellular system 100 illustrated in FIG. 1 includes one or more UEs 110 (two UEs are shown), a radio access network (RAN) 120 a core network (CN) 130, IMS 140, and external internet protocol (IP) networks 145. The core network 130 further includes a home subscriber server (HSS) 135, and the IMS further includes an IMS application server 150.

UE 110 may be any mobile electronic device used by an end-user to communicate, for example, within the cellular system 100. The UE 110 may be referred to as mobile electronic device, mobile device, user device, mobile station, subscriber station, or wireless terminal. UE 110 may be a cellular phone, personal data assistant (PDA), smartphone, laptop, tablet personal computer (PC), or other wireless communications device. Further, UEs 110 may include pagers, portable computers, Session Initiation Protocol (SIP) phones, one or more processors within devices, or any other suitable processing devices capable of communicating information using a radio technology. UE 110 may communicate directly with a base station 115 included in a RAN 120 to receive service when UE 110 is operated within the cell associated with the corresponding base station 115. UE 110 may also receive radio signals from more than one base station 115 included in RAN 120.

Functionally, the UEs 110 may be used as a platform for different applications of communications. For example, the UEs 110 may be used for interacting with the cellular network by transmitting/receiving signals for initiating, maintaining or terminating the communications the end-user requested. The UE 110 may also include mobility management functions such as handovers and reporting the location, and in these the UE 110 performs as instructed by the cellular network. One exemplary function of the UE 110 may be to provide the user interface to the end-user so that applications such as voice call, video communication, data transmission or web browsing may be implemented.

In some implementations, UEs 110 may transmit in one or more cellular bands. One or more UEs 110 may be communicably coupled to the RAN 120. In these cases, messages transmitted and/or received by UEs 110 may be based on a multiple access technology. In some implementations, the UEs 110 are configured to use orthogonal frequency division multiple access (OFDMA) technology or single carrier—frequency division multiple access (SC-FDMA) technology to communicate with the base station 115. In some other implementations, eNBs 115 may also accommodate UEs 110 using multiple access technologies such as time division multiple access (TDMA), frequency division multiple access (FDMA) and code division multiple access (CDMA). The UEs 110 may transmit voice, video, multimedia, text, web content and/or any other user/client-specific content. Some multimedia content, e.g., video and web content, may take advantage of high channel throughput based on multiple-input-multiple-output (MIMO) technology. MIMO technology may enable the system to set up multiple data streams on the same channel, thereby increasing the throughput of the channel. In short, UEs 110 generate requests, responses or otherwise communicate in different means with core network 130 and/or Internet Protocol (IP) networks 145 through RAN 120. A few components included in the UE 110 and their corresponding functionalities are further described in the illustration of FIG. 6.

A RAN 120 is part of a telecommunication system which implements a radio access technology, such as Global System for Mobile Communications (GSM), CDMA, Universal Mobile Telecommunications System (UMTS) and 3GPP Long Term Evolution (LTE). In some applications, the RAN 120 for a 3GPP LTE system is called an EUTRAN. The RAN 120 can locate between the UEs 110 and the CN 130. The RAN 120 includes one or more base stations 115. The base stations 115 can be radio base stations 115 that may control one or more radio related functions in a fixed part of the system. The base station 115 may directly communicate to one or more UEs 110, other base stations 115 and the CN 130. The base station 115 may be the end point of the radio protocols towards the UEs 110 and may relay signals between the radio connection and the connectivity towards the CN 130.

A CN 130, or a backbone network, can be the central part of a telecommunications network. Functionally, CN 130 may be used for providing various services to customers connected by the RAN 120, including routing calls across the RAN 120, IP networks and/or public switched telephone network (PSTN). In LTE system, the main component of CN 130 is the evolved packet core (EPC). The CN 130 may include a home subscriber server (HSS) 135. In some implementations, the HSS is also called a User Profile Server Function (UPSF). The HSS 135 is a master user database that supports the IMS network entities that actually handle calls. The HSS 135 contains the subscription-related information (e.g., subscriber profiles) and user identifies, performs authentication and authorization of the UEs 110, and can provide information about the UE's location and IP information. Various user identities may be associated with IMS, e.g, IP Multimedia Private Identity (IMPI), IP Multimedia Public Identity (IMPU), Globally Routable User Agent URI (GRUU), Wildcarded Public User Identity. In some implementations, the core network 130 can include an IMS core network.

An IMS 140 is an architectural framework for delivering Internet Protocol (IP) multimedia services. To ease the integration with the external IP networks 145, IMS 140 uses Internet Engineering Task Force (IETF) protocols, e.g. SIP. IMS 140 may be used to help the access of multimedia and voice applications from wireless and wireline terminals. In other words, the IMS 140 may create a form of fixed-mobile convergence. This is done by having a horizontal control layer that isolates the RAN 120 from the service layer. From a logical architecture perspective, services may not have their own control functions, as the control layer can be used as a common horizontal layer. The IMS 150 are communicably coupled to the CN 130 and RAN 120 to provide multimedia services to UEs. In some implementations, network components included in CN 130 and RAN 120 can be used to form part of the IMS 140. The IMS 140 may communicate with a UE 110 or the external IP networks 145 using Internet Protocol for IP addressing and routing. The IMS 140 may include an IMS application server 150. The IMS application server 150 may host one or more applications for providing multimedia services to UEs 110. A few components included in the IMS server 150 and their corresponding functionalities are further described in the illustration of FIG. 6. In some implementations, the IMS 140 may be communicably coupled to a PSTN (not shown) and/or external IP networks 145. The external IP networks 145 may include public networks (e.g., Internet) and private networks that support Internet Protocol.

In some aspects of operation, an IMS SIP message may be sent by UE 110 through the RAN 120 and CN 130 that includes an IMS CN, to the IMS AS server 150. While transmitting through the IMS CN, a P-CSCF included in the IMS CN may process the IMS SIP message by at least retrieving a session description protocol information from the IMS SIP message, and a S-CSCF included in the IMS CN may process the IMS SIP message by at least retrieving an initial Filter Criteria from the HSS 135, and executing a service control logic. For a non-"IMS SIP" message sent by UE 110, the message may be delivered to the IMS AS server 150 without being processed by the P-CSCF and S-CSCF. It is to be understood that although UE 110 is used in here as an example electronic device to generally represent a terminal for IMS communication, any other electronic devices (e.g., server, PBX, gateway, etc.) that can transmit and receive IMS SIP and non-"IMS SIP" messages may also be used as terminal devices in the various implementations of this disclosure.

Though described in terms of FIG. 1, the present disclosure is not limited to such a cellular system. In general, cellular telecommunication systems may be described as cellular networks made up of a number of radio cells, or cells that are each served by a base station or other fixed transceiver. The cells are used to cover different areas in order to provide radio coverage over an area. Example cellular telecommunication systems include Global System for Mobile Communication (GSM) protocols, Universal Mobile Telecommunications System (UMTS), 3GPP Long Term Evolution (LTE), and others. In addition to cellular telecommunication systems, other wireless communication systems that are suitable for the various implementations described in the present disclosure may include but not limited to IEEE 802.11 suite wireless local area network, IEEE 802.15.4 system, Bluetooth system, IEEE 802.16 WiMAX network, etc. Accordingly, the RAN 120, CN 130, external IP networks 145 can be the RAN, CN and external IP networks included in any wireless communication systems without departing from the scope of this disclosure.

Figure 2:
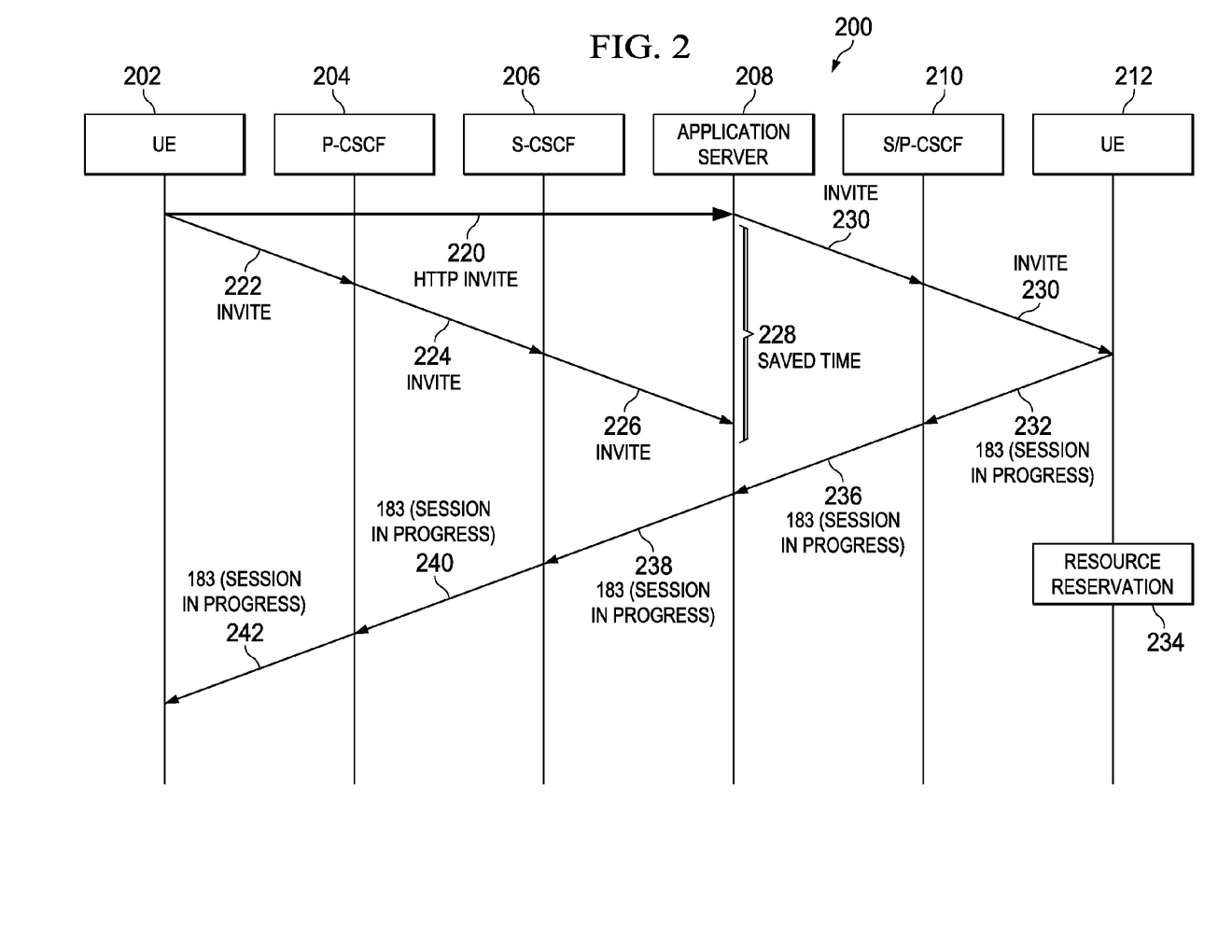
FIG. 2 is a swim lane diagram illustrating an example process of IMS session initiation based on using non-IMS protocol.

FIG. 2 is a swim lane diagram illustrating an example process 200 of IMS session initiation based on using non-IMS protocol. The illustrated example process 200 is implemented by network components including UE 202, a P-CSCF 204, a S-CSCF 206, an application server (AS) 208, a server and/or proxy CSCF (S/P-CSCF) 210 and UE 212. The P-CSCF 204 and S-CSCF 206 may be located in UE 202's home network, S/P-CSCF 210 may be located in a visiting network UE 202 or a home network for UE 212. In some implementations, before the IMS session, UE 202, UE 212, or both may have been authenticated and authorized by the AS 208 for establishing a secure communication channel. The authentication procedure may be based on security provided by a transport protocol. For example, if the non-"IMS SIP" protocol is an HTTP/TCP protocol, then transport layer security (TLS) may be used to secure the communication channel. The communication channel can also be secured using Internet Protocol Security (IPSec) in transport or tunneling mode, or other proprietary protocols. As described in the illustration of FIG. 1, although UE is used as an example terminal device for IMS communication, any other electronic devices (e.g., server, PBX, gateway, etc.) that can transmit and receive IMS SIP and non-"IMS SIP" messages may also be used as terminal devices based on specific implementation.

At 220, UE 202 transmits a non-"IMS SIP" message (e.g., HTTP request) to the AS 208. The AS 208 may be an IMS AS 150 as described in the illustration of FIG. 1. The message can be an indication of a SIP call/session/dialog being initiated by UE 202. The non-"IMS SIP" may be any protocol that can deliver the non-"IMS SIP" message faster than SIP to the AS 208. The non-"IMS SIP" may include HTTP, IETF SIP, REST, TCP, P2P protocols and proprietary protocols. In some implementations, the non-"IMS SIP" message may be sent to the AS 208 through a network that is different from the IMS network, e.g, the external IP networks 145 as described in the illustration of FIG. 1. In this particular example, an HTTP INVITE request is considered as the non-"IMS SIP" message. The HTTP INVITE request that indicates a SIP call/session/dialog being initiated may comprise an HTTP header and/or a header-parameter with e.g., verb "INVITE". The HTTP INVITE request may also contain a parameter indicating a destination address of the upcoming SIP call/session/dialog (e.g., the address of UE#2 212). The parameter may be in the form of SIP Uniform Resource Identifier (URI) or any other form which can allow the AS 208 to generate a valid SIP URI address of the destination. The HTTP request may also contain a Session Description Protocol (SDP) offer that UE 202 can send on the SIP leg 222 of the call/session/dialog. In some implementations, when UE 202 initiates multiple sessions to the same destination at the same time, the HTTP request may also contain a header/parameter that can help the AS 208 to correlate the HTTP request with the upcoming SIP requests (e.g. SIP INVITEs 222). The header/parameter may have values including IMS Communication Service Identifier (ICSI)/IMS Application Reference Identifier (IARI), user agent capabilities, caller preferences, SIP Call-ID header. In some implementations, the AS 208 may query UE 202 using a SIP request (e.g., SIP OPTIONS request). Accordingly, the AS 208 may receive an SDP offer in a message that is in the response to the SIP request. Other SIP and non-IMS SIP implementations may also be used to obtain an SDP offer for UE 202 at the AS 208 without departing from the scope of this disclosure.

At 222, UE 202 can initiate a regular SIP INVITE dialog/call/session with UE 212. Detailed illustration of the regular SIP INVITE dialog/session/call initiation procedure can be found in the 3GPP IMS standard technical specification (TS) 24.229. In short, the SIP INVITE request is first transmitted to a P-CSCF 204. Multiple roles of SIP proxies or servers may be collectively called a CSCF. The functions of SIP servers and the proxies are respectively the P-CSCF 206 and S-CSCF 208. The CSCF can be used to process SIP signaling packets in the IMS. A P-CSCF 206 is a SIP proxy that can be the first point of contact for the IMS terminal. It can be located either in a visited network or in a home network. After receiving the SIP INVITE request, the P-CSCF can take a snapshot of the SDP in the INVITE request and route the SIP INVITE request to the S-CSCF 206 at 224. After receiving and validating the SIP INVITE request, the S-CSCF 206 can retrieve an iFC from the HSS, such as a HSS 135 described in the illustration of FIG. 1, and forward the SIP INVTE to the AS 208 at 226. Based on the received SIP INVITE request, the AS 208 may decode an SDP offer that identifies the IMS services requested by UE 202. Compared to the transmission of HTTP INVITE 220, the SIP INVITE is processed by both the P-CSCF 204 and the S-CSCF 206, which may results in a longer transmission time for the INVITE request to arrive at the AS 208. The non-"IMS SIP" message may not traverse IMS CN on the UE#1-AS call leg 202. Therefore, the AS 208 can start the SIP INVITE call flows at 230 based on receiving the non-IMS SIP IMS message instead of the regular SIP INVITE request, and a time 228 can be saved during the SIP dialog/session/call initiation procedure.

Once the AS 208 receives the non-"IMS SIP" message transmitted by UE#1 202 at 220, it can perform at least one of the following: 1) authenticate and validate the received non-"IMS SIP" message; 2) decode the destination address information from the non-"IMS SIP" message (e.g. SIP URI); 3) identify if an SDP offer is included in the non-"IMS SIP" message and if an SDP offer is included, decode and store an SDP offer based on the non-"IMS SIP" message; 4) generate a SIP INVITE request according to the rules defined in 3GPP TS24.229; 5) set the destination address in the generated SIP INVITE request; 6) set the pre-stored SDP offer in the SIP INVITE request; or 7) Initiate a SIP dialog 230 with IMS CN, such as the CN 130 described in the illustration of FIG. 1.

At 230, the SIP invite is transmitted to UE 212 through an S-CSCF and/or a P-CSCF (S/P-CSCF) 210 based on the decoded destination address. At 234, an IMS network resource is reserved by UE 212. The IMS network resources may correspond to one or more multimedia services that may be used in the IMS SIP communication session. At 232, UE 212 sends a SIP 183 response that includes an SDP answer to the S/P-CSCF 212 and the SIP 183 response is forwarded to the AS 208 at 236.

The AS 208 awaits for the SIP INVITE request from UE 202 and SIP 183 (Session in Progress) response (or any other SIP response with SDP answer) from the UE 212. When both the SIP INVITE request and the SIP 183 response have been received by the AS 208, the AS 208 can decode the SDP answer based on, e.g., the SIP 183 of the UE 212. The SDP answer may be included in a SIP 183 or any other SIP response messages. The AS 208 may also store the SDP offer from UE#1 202 and the SDP answer from UE#2 212. At 238, SDP answer may be included in a SIP response message (e.g., SIP 183 response) to the S-CSCF 206. The SIP response message can further be forwarded to the P-CSCF 204 at 240 and finally to UE 202 at 242.

In some implementations, the AS 208 may detect a codec mismatch between the SIP INVITE SDP offer from UE 202 and an SDP answer from UE 212, i.e., the multimedia services associated with the SDP offer may use different codecs compared to the SDP answer. The AS 208 may act as a back to back user agent (B2BUA), it may invoke IMS Media Resource Function Controller (MRFC)/Media Resource Function Processor (MRFP), or other transcoding functions in order to transcode media between the sessions associated with SDP offer and SDP answer. For example, an AS 208 may receive a HTTP INVITE request from UE 202 and initiate a SIP session with the UE 212 using codecs 1 and 2. However, due to an internal policy, the carriers may invoke a media transcoding function and replaces codecs 1 and 2 with codecs 3 and 4. UE 212 may respond to the SIP INVITE (including SDP offer associated with codecs 1 and 2) from the AS 208 with codec 2. Thus, a codec mismatch (UE#1 202 with codecs 3 and 4, and UE#2 212 with codecs 2) may be detected by the AS 208. The AS 208 may then establish a session with the MFRC. The MRFC may allocate resources on MRFP for the transcoding between codecs 3/4 and 2. The AS 208 can reply using a SIP response with codecs 3 and 4 in response to the SIP INVITE from UE 202. The AS 208 can also use codec 2 in any upcoming SIP transactions (e.g. SIP UPDATE) with SDP offer on the interface with UE 212. The MRFP can then transcode the media stream with codecs 3 or 4 from the UE to codec 2 on the interface to the UE#2, and vice versa.

Figure 3:
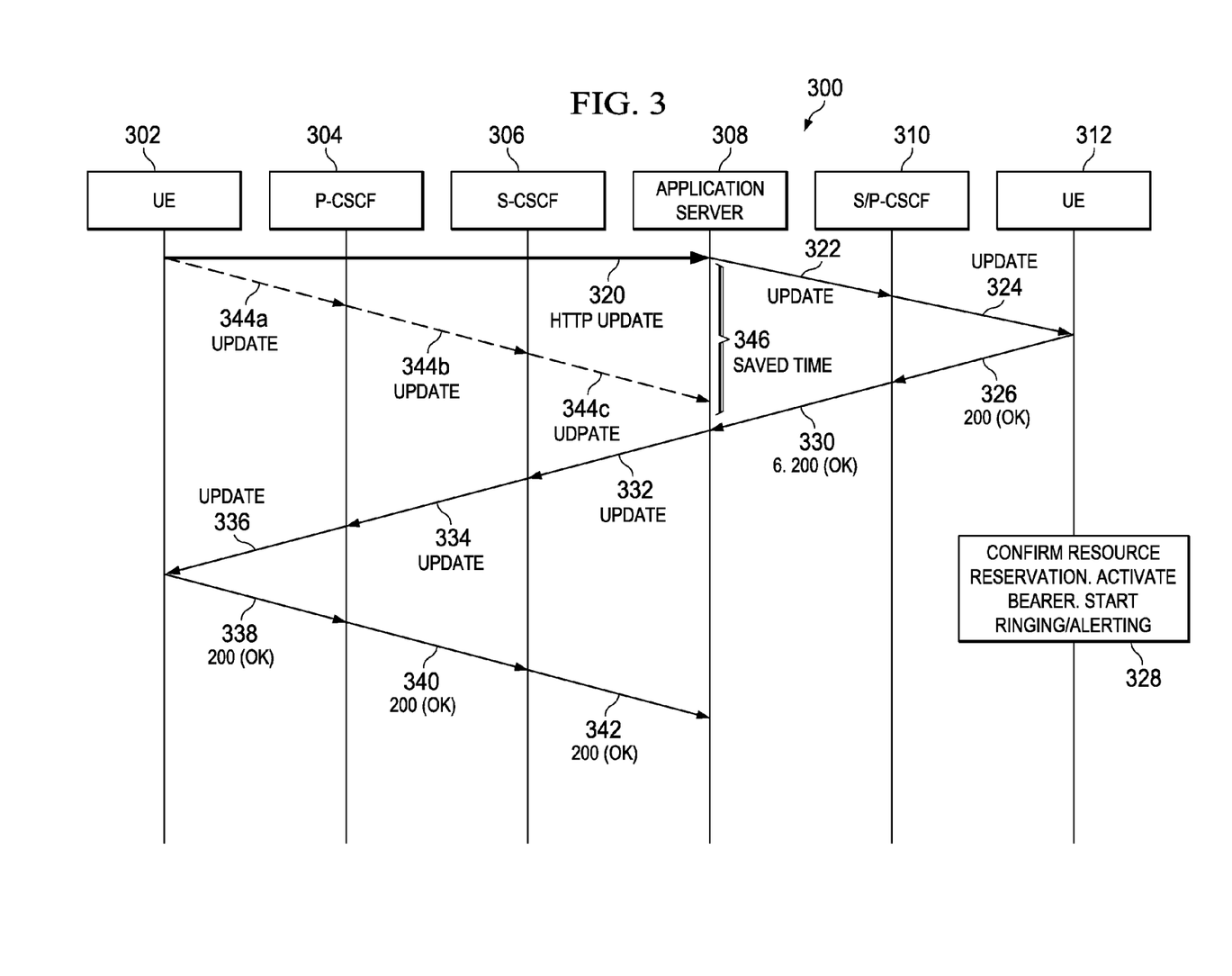
FIG. 3 is a swim lane diagram illustrating an example bearer activation process in IMS based on using non-IMS protocol.

FIG. 3 is a swim lane diagram illustrating an example bearer activation process 300 in IMS based on using non-IMS protocol. The illustrated example process 300 is implemented by network components including UE 302, a P-CSCF 304, a S-CSCF 306, an AS 308, a S/P-CSCF 310 and UE 312. The P-CSCF 304 and S-CSCF 306 may be located in the home network of UE 302, S/P-CSCF 310 may be located in the visiting network of the UE 302 or the home network of the UE 312. In some implementations, it is assumed that before the bearer activation process, UE 302 and UE 312 have initialized and/or completed the resource reservation procedure after performing the example process 200 illustrated in FIG. 2, or a regular IMS SIP session initiation process. Further, the AS 308 may obtain and/or store a copy of the SDP offer from UE 302.

At 320, UE 302 sends a non-"IMS SIP" message, e.g. an HTTP UPDATE request to the AS 308. The HTTP UPDATE request may include an HTTP header or a header-parameter with, e.g. verb "UPDATE", or any other parameter that may be used by the AS to identify an action to be performed on the SIP call leg of the call/dialog/session. In some instances, the non-"IMS SIP" message may also include a parameter (e.g. SIP Call-Id header) that can help the AS 308 to correlate the non-"IMS SIP" message with an existing SIP dialog/session/call. In some instances, the non-"IMS SIP" message may further include an indication identifying that UE 302 has requested to activate the bearer. The indication may include, for example, an SDP parameter "a=sendrecv" or "a=sendonly". In some instances, the non-"IMS SIP" message may further include an updated SDP offer of UE 302.

In the diagram shown in FIG. 300, a regular SIP UPDATE request sent by UE 302 through the P-CSCF 304 at 344a, and the S-CSCF 306 at 344b to the AS 308 at 344c is shown for comparison purpose only. In the example process 300 for bearer activation, the regular SIP UPDATE request may not be sent. Since the SDP associated with UE 302 is assumed to be obtained by the AS 308 during the IMS SIP session initiation process, the system can use the obtained SDP information for bearer activation. Similar to the regular SIP INVITE request, the SIP UPDATE request may arrive at the AS 308 through multiple hops, which may cause time delays. An example saved time 346 for using non-"IMS SIP" message is shown in FIG. 3 though no SIP INVITE request may be transmitted by UE 302.

In some implementations, the UE 302 sends only HTTP "UPDATE" request, but no messages are sent on the SIP leg of the call/dialog/session. However, the P-CSCF which the UE 302 is connected to processes SDPs from both UE 302 and UE 312 in order to contact PCC and activate the bearer. After receiving the HTTP UPDATE request at 320, the AS 308 can perform at least one of the following: 1) authenticate, validate and correlate the HTTP UPDATE request with an existing SIP session; 2) decode and store an SDP offer from the non-"IMS SIP" if an SDP offer is included in the HTTP UPDATE request; 3) generate a SIP UPDATE request and depending on the specific implementation, the request generated may also be Provisional SIP Response Acknowledgement (PRACK), SIP INFO, SIP Re-INVITE and/or SIP OPTIONS; 4) set the pre-stored SDP offer in the SIP UPDATE request; or 5) send the SIP message/request to IMS CN at 322.

A SIP messaging call flow starting at 322 between the AS 308 and UE 312 can be standard IMS call flows as defined in 3GPP TS24.229. The S/P-CSCF 310 of UE 312 can make final adjustments for the bearer when the SIP messages cross the S/P-CSCF at 324 and 326. The message transmitted by UE 312 at 326 may be a SIP 200 (OK) message. At 328, UE 312 may confirm resource reservation, activate bearer, and/or start ringing/alerting the end-user for the incoming media session initiated by UE 302. At 330, the S/P-CSCF 310 can forward the SIP 200 (OK) to the AS 308. When the AS receives the SIP 200 for the SIP UPDATE request from UE 312, it can decode an SDP answer from the SIP 200 and include it into a SIP UPDATE request on the SIP call leg towards UE 302. The SDP becomes an offer SDP on the UE SIP call leg. The AS 308 sends the SIP UPDATE message through the S-CSCF at 332, the P-CSCF at 334 to UE 302 at 336. UE 302 receives, processes and responds to the message with its own SDP answer and sends a SIP 200 (OK) to the P-CSCF 304. The P-CSCF 304 can make final adjustments for the bearer after receiving the SIP 200 at 338, and forward it through S-CSCF 306 at 340 to the AS 308 at 342.

Figure 4:
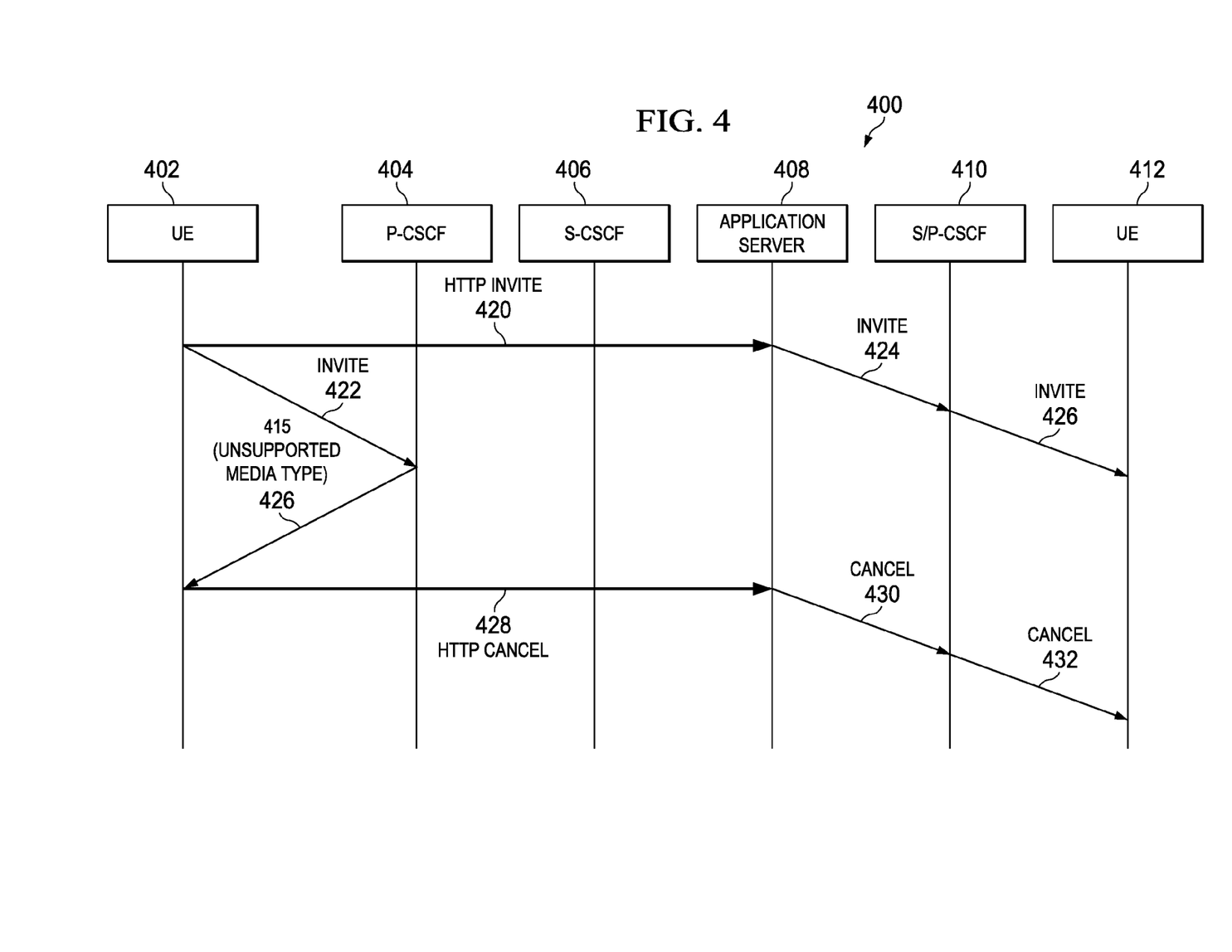
FIG. 4 is a swim lane diagram illustrating an example IMS procedure when an SIP INVITE request is rejected.

FIG. 4 is a swim lane diagram illustrating an example IMS procedure 400 when an SIP INVITE request is rejected by the IMS CN due to, for instance, an unsupported media type in the SDP body. The illustrated example process 400 is implemented by network components including UE 402, a P-CSCF 404, a S-CSCF 406, an AS 408, a S/P-CSCF 410 and UE 412. In the illustrated example procedure 400, at 420, a non-"IMS SIP" INVITE request, e.g., an HTTP INVITE is sent by UE 402 to the AS 408, and the AS 408 sends SIP INVITE through the S/P-CSCF 410 at 424 to UE 312 at 426 using similar process as described in the illustration of FIG. 2. However, the SIP INVITE request sent at 422 is rejected by the P-CSCF 404, due to an unsupported media type error at 426, it will be understood that there may be other reasons for the rejection. UE 402 may cancel the call establishment procedure by sending, for example, an HTTP CANCEL message to the AS 408 at 428. The AS 408 may further cancel the SIP session with UE 412 by sending the CANCEL message through the S/P-CSCF 410 at 430 to UE 412 at 432.

Figure 5:
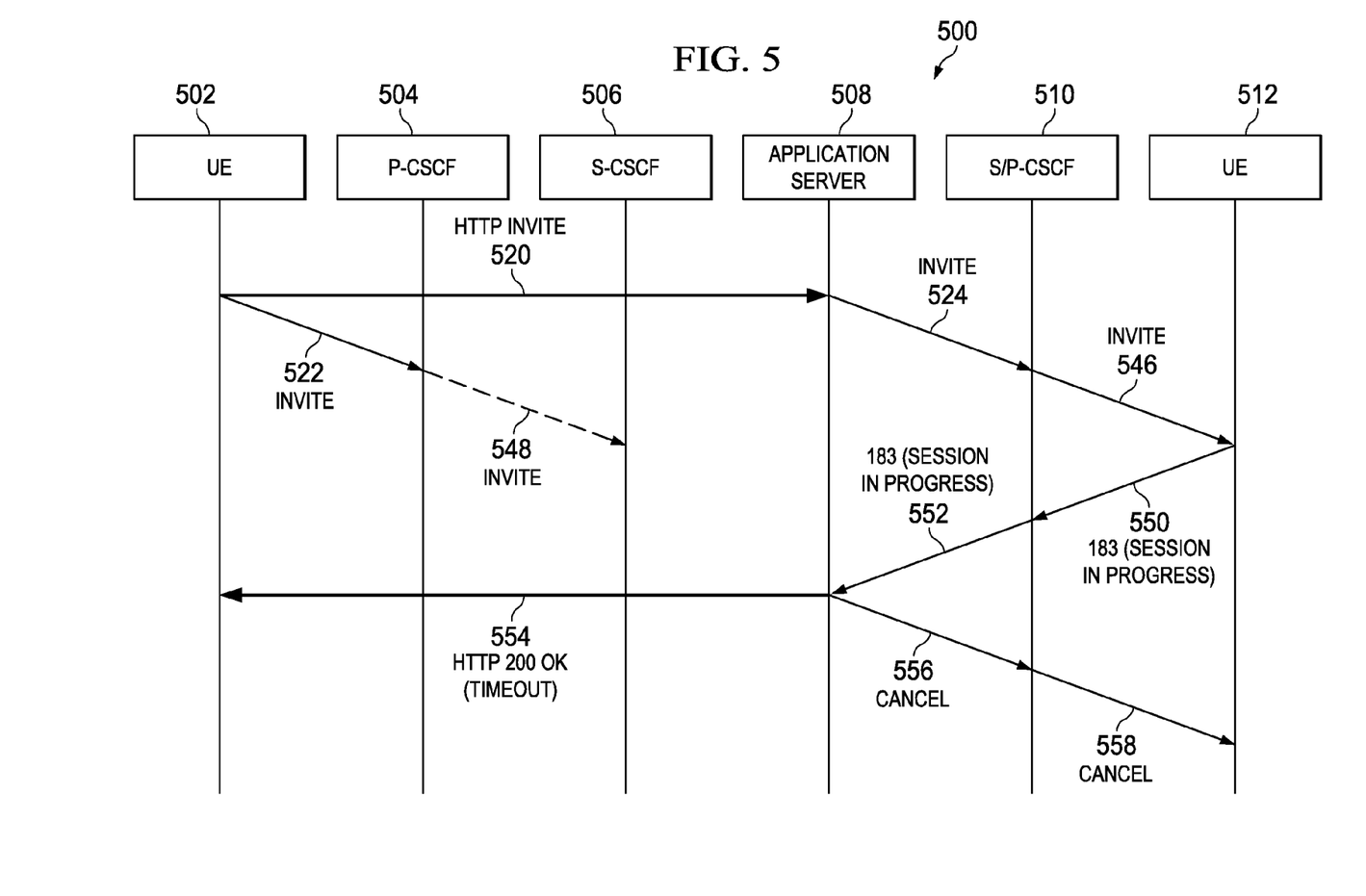
FIG. 5 is a swim lane diagram illustrating an example IMS procedure when an SIP INVITE request is delayed.

FIG. 5 is a swim lane diagram illustrating an example IMS procedure 500 when an SIP INVITE request is delayed. The illustrated example process 500 is implemented by network components including UE 502, a P-CSCF 504, a S-CSCF 506, an AS 508, a S/P-CSCF 510 and UE 512. In the illustrated example procedure 500, at 520, UE 502 sends a non-"IMS SIP" message, e.g., a HTTP INVITE request, to the AS 508. The AS 508 sends SIP INVITE through the S/P-CSCF 510 at 524 to UE at 546. A 183 (Session in Progress) response is returned by UE 512 through the S/P-CSCF at 550 to the AS at 552. The SIP INVITE request sent from UE 502 is received by the P-CSCF 504 at 522 and is forwarded to the S-CSCF 506 at 548, but is not received by the S-CSCF yet. The AS 508 may cancel the SIP session with the UE by sending a SIP CANCEL request through the S/P-CSCF 510 at 556 to UE 512 at 558. The AS may return an error code or a reason in a non-"IMS SIP" response message, e.g., an HTTP response (200 OK) message 554. The HTTP response message may contain a "reason" header with value "timeout on SIP bearer".

In some implementations, prior to sending the SIP CANCEL request at 556, the AS 508 may start a timer while waiting for the incoming SIP INVITE from UE 502 to arrive. If the timer expires, the AS 508 can send the SIP CANCEL request. The value of the timer may be implementation specific. The value may be dynamically adjusted by the AS 208 based on a "learning" procedure by the AS 208 of the networking conditions/responsiveness from previous sessions. In some instances, the value of the timer may not exceed 2-3 seconds for real time sessions such as voice or video calls.

In some implementations, an AS has initiated a SIP session to UE 512 but received an error SIP response (e.g. SIP 486 Busy Here), the AS may transmit the response back to UE 502 based on the status of the SIP session with the UE 502 as follows: 1) If the AS has received a SIP request from UE 502 (e.g. SIP INVITE), the AS may transmit the SIP reject code/reason (e.g. SIP 486 Busy Here) from the UE#2 in a SIP response to the SIP request from the UE 502; 2) If the AS has not received a SIP request from the UE 502, the AS may propagate the SIP reject code/reason in a non-"IMS SIP" response similar to the corresponding process described in the illustration of FIG. 5.

In some implementation, an AS receives a non-"IMS SIP" INVITE, but due to an internal/syntax or other error, it cannot initiate a SIP session with UE 512. The AS can respond to the non-"IMS SIP" INVITE with a non-"IMS SIP" response. The non-"IMS SIP" response may include a code or a reason of the failure.

In some implementations, an AS receives a SIP INVITE without a previously queued non-"IMS SIP" INVITE. Then the AS may follow the standard IMS flows procedures as described in 3GPP TS24.229. The AS may also reject using an error code (e.g., 481 "Call leg/transaction does not exist" response code) to the non-"IMS SIP" INVITE messages received after the received SIP INVITE.

Figure 6:
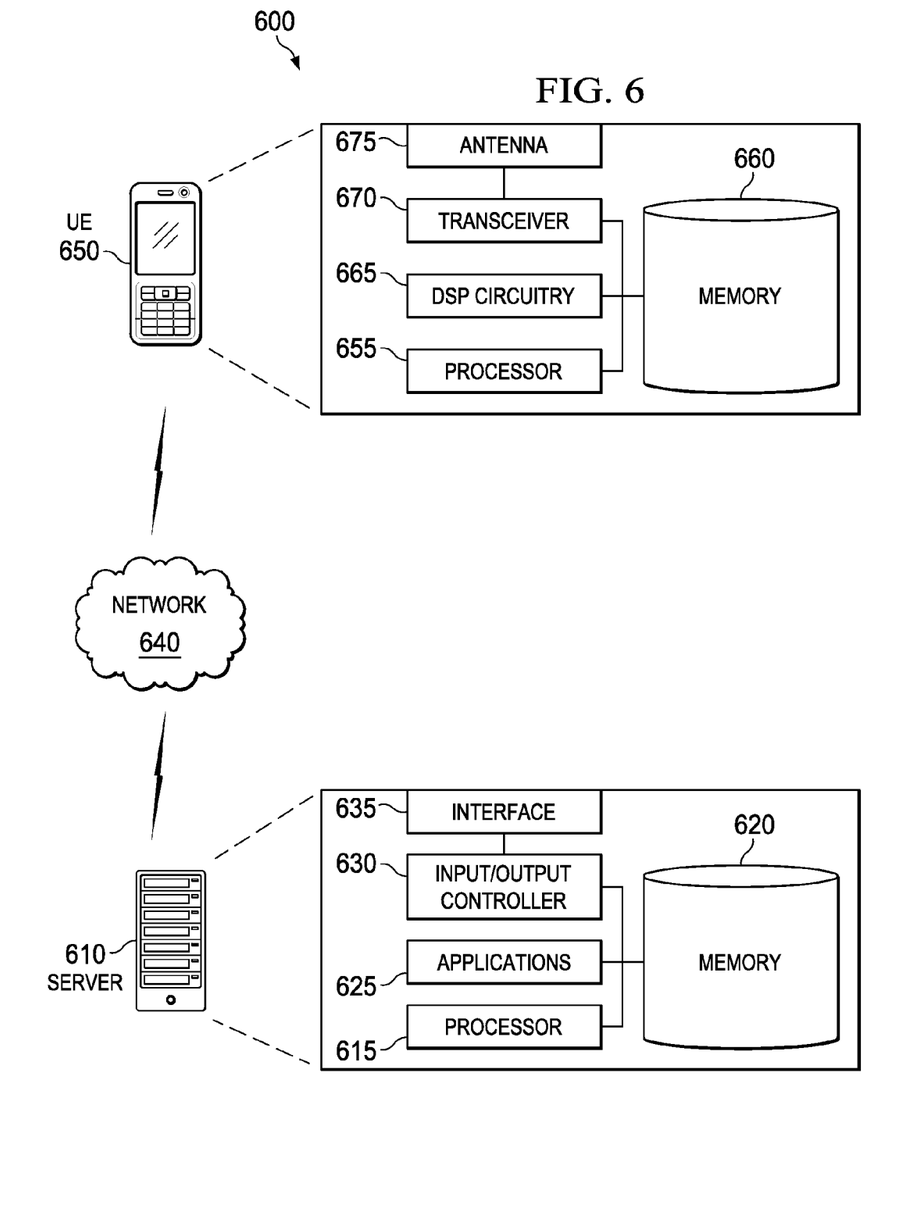
FIG. 6 is a schematic representation of a server and user equipment operable for some of the various implementations of the disclosure.

FIG. 6 is a schematic representation 600 of a server 610 and UE 650 operable for some of the various implementations of the disclosure. The server 610 and the UE 650 may be, respectively, the IMS application server 150 and the UE 110 as described in the illustration of FIG. 1. The server 610 and the UE 650 may be communicably coupled through a network 640, such as the cellular system 100 in FIG. 1. The UE 650 may further include at least one processor 655, a memory 660, a DSP circuitry 665, a transceiver 670, and at least one antenna 675.

The processor 655 may comprise a microprocessor, central processing unit, graphic control unit, network processor, or other processor for carrying out instructions stored in memory 660. The functions of the processor 655 may include computation, queue management, control processing, graphic acceleration, video decoding, and execution of a sequence of stored instructions from the program kept in the memory module 660. In some implementations, the processor 665 may also be responsible for signal processing including sampling, quantizing, encoding/decoding, and/or modulation/demodulation of the signal. The memory module 660 may include a temporary state device (e.g., random-access memory (RAM)) and data storage. The memory module 660 can be used to store data or programs (i.e., sequences of instructions) on a temporary or permanent basis for use in a UE.

The wireless transceiver 670 can include both the transmitter circuitry and the receiver circuitry. The wireless transceiver 670 may be responsible for converting a baseband signal to a passband signal or vice versa. The components of wireless transceiver 670 may include a digital to analog converter/analog to digital converter, amplifier, frequency filter and oscillator. In addition, the wireless transceiver 670 may also include or communicably coupled to a digital signal processing (DSP) circuitry 665. The DSP circuitry 665 may perform functionalities including encoding/decoding, detecting, estimating, modulating and/or demodulating signals. The transceiver 670 may be communicably to one or more antennas 675.

The antenna 675 is a transducer which can transmit and/or receive electromagnetic waves. Antenna 675 can convert electromagnetic radiation into electric current, or vice versa. Antenna 675 is generally responsible for the transmission and reception of radio waves, and can serve as the interface between the transceiver 206 and the wireless channel. In some implementations, the wireless station 675 may be equipped with more than one antenna to take advantage of multiple-input-multiple-output (MIMO) technology. MIMO technology may provide a process to utilize the multiple signal paths to reduce the impact of multipath fading and/or to improve the throughput. By using multiple antennas at wireless station, MIMO technology may enable the system to set up multiple parallel data streams on the same channel, thereby increasing the throughput of the channel.

The server 610 may include at least one processor 615, a memory 620, one or more applications 625, an input/output controller 625, and an interface 635. The server may be an IMS SIP AS that can host and execute services, and interface with the S-CSCF using SIP. An example of an application server that is being developed in 3GPP is the Voice call continuity Function (VCC Server). Depending on the actual service, the AS 610 can operate in SIP proxy mode, SIP UA mode or SIP B2BUA mode. An AS 610 can be located in a home network or in an external third-party network (e.g., the external IP networks 145 described in the illustration of FIG. 1). If the server 610 is located in the home network, it can query the HSS with the Diameter Sh or Si interfaces.

The processor 615 included in the server 610 can execute one or more multimedia applications 625 to provide IMS multimedia services. The processor 615 may be a central processing unit (CPU), a blade, an application specific integrated circuit (ASIC), a field-programmable gate array (FPGA), or another suitable component. Generally, the processor 615 executes instructions and manipulates data to perform the operations of the server 610 and, specifically, the one or more applications 625. Regardless of the particular implementation, applications 625 may include computer-readable instructions, firmware, wired or programmed hardware, or any combination thereof on a tangible and non-transitory medium operable when executed to perform at least the processes and operations described herein. Indeed, each software component may be fully or partially written or described in any appropriate computer language including C, C++, Java, Visual Basic, assembler, Perl, any suitable version of 4GL, as well as others. Processors 615 suitable for the execution of applications 625 include, by way of example, both general and special purpose microprocessors, and any one or more processors of any kind of digital computer. Generally, a processor 615 will receive instructions and data from the memory 620. Devices suitable for storing applications 625 and data include all forms of non-volatile memory, media and memory devices, including by way of example, semiconductor memory devices, e.g., EPROM, EEPROM, and flash memory devices; magnetic disks, e.g., internal hard disks or removable disks; magneto optical disks; and CD ROM and DVD-ROM disks. The processor 615 and the memory 620 can be supplemented by, or incorporated in, special purpose logic circuitry.

The memory 620 included in the server 610 may be any memory or database module and may take the form of volatile or non-volatile memory including, without limitation, magnetic media, optical media, random access memory (RAM), read-only memory (ROM), removable media, or any other suitable local or remote memory component.

The input/output controller 630 may be a circuitry or module to control the input and/or output of the interface 635. The interface 635 is used by the server 610 for communicating with other network components, such as the network components described in the illustration of FIG. 1. Generally, the interface 635 includes logic encoded in software and/or hardware in a suitable combination and operable to communicate with the network 640 (e.g., an IMS network). More specifically, the interface 635 may comprise software supporting one or more communication protocols (e.g., SIP, HTTP, P2P, etc.) associated with communications such that the network 640 or interface's hardware is operable to communicate physical signals within and outside of a cellular network. In some instances, the interface's hardware may include wireless transceivers and antenna (not shown).

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method comprising:
   receiving, directly from a first electronic device, a non-IMS Session Initiation Protocol (SIP) message through an IP network independent of routing through a Proxy-Call Session Control Function (P-CSCF) and a Serving-CSCF (S-CSCF);
   identifying a request to initiate an IMS communication session through the IMS network with a second electronic device based, at least in part, on the non-IMS SIP message;
   identifying the received non-IMS SIP message for authentication information associated with the first electronic device and a destination address associated with a second electronic device;
   validating the first electronic device based, at least in part, on the identified authentication information;
   initiating the IMS communication session with the second electronic device in response to the request;
   receiving, from the first electronic device, a first SIP message through an IMS network;

associating the received first SIP message with the initiated IMS communication session;
transmitting, to the second electronic device, a second SIP message that includes the destination address; and
initiating a SIP dialog with an IMS core network during the initiated IMS communication session.

2. The method of claim 1, further comprising executing instructions to identify a Session Description Protocol (SDP) offer based, at least in part, on the received non-IMS SIP message, storing the identified SDP offer to a memory communicably coupled to at least one hardware processor, and wherein the SIP invite message further includes the SDP offer.

3. The method of claim 1, further comprising:
identifying a Session Description Protocol (SDP) offer based, at least in part, on the received non-IMS SIP message;
receiving a first SIP response from the second electronic device;
identifying, the first SIP response for an SDP answer;
storing the SDP offer and the SDP answer to a memory communicably coupled to at least one hardware processor; and
transmitting, to the first electronic device, a second SIP response that includes information associated with the SDP answer for resource reservation.

4. The method of claim 3, further comprising:
determining a first codec based, at least in part, on the SDP offer;
determining a second codec based, at least in part, on the SDP answer, wherein the second codec is different from the determined first codec;
transcoding the first codec to the second codec for an SIP message transmitted from the first electronic device to the second electronic device; and
transcoding the second codec to the first codec for an SIP message transmitted from the second electronic device to the first electronic device.

5. A method comprising:
receiving, from a first electronic device, a first session initiation protocol (SIP) message through an IMS network;
identifying Session Description Protocol (SDP) information and a request for initiating a SIP INVITE session between the first electronic device and the application server based, at least in part, on the received first SIP message, wherein the SIP INVITE session is routed through the IMS network;
initiating an IMS communication session based on the SDP information;
initializing a resource reservation procedure with the first electronic device in response to the request;
receiving, directly from the first electronic device, a non-IMS SIP message through the IMS network independent of routing through a Proxy-Call Session Control Function (P-CSCF) and a Serving-CSCF (S-CSCF);
identifying an indication associated with a request for activating a bearer for a media service for the IMS communication session base, at least in part, on the received non-IMS SIP message;
identifying authentication information associated with the first electronic device and an indication that indicates an association of the non-IMS SIP message and the IMS communication session based, at least in part, on the received non-IMS SIP message;
validating the first electronic device based on the identified authentication information; and
associating the non-IMS SIP message and the IMS communication session based on the identified indication; and
transmitting a second SIP message for initiating a bearer activation procedure in response to the indication.

6. The method of claim 5, further comprising storing the identified SDP information associated with the first electronic device to a memory communicably coupled to at least one hardware processor.

7. The method of claim 5, further executing instructions to identify an SDP offer based, at least in part, on the received non-IMS SIP message, and storing the SDP offer to a memory communicably coupled to at least one hardware processor.

8. The method of claim 7, wherein transmitting the second SIP message further includes transmitting, to a IMS core network, the second SIP message during the associated IMS communication session, wherein the second SIP message further includes information associated with the SDP offer.

9. The method of claim 8, further comprising:
receiving a first SIP response from the second electronic device;
identifying an SDP answer based, at least in part, on the first SIP response;
storing the SDP offer and the SDP answer to a memory communicably coupled to at least one hardware processor; and
transmitting a second SIP response that includes the SDP answer to the first electronic device.

10. A non-transitory computer-readable medium storing instructions that are executable by one or more data processing apparatus to perform operations comprising:
receiving, directly from a first electronic device, a non-IMS Session Initiation Protocol (SIP) message through an IP network independent of routing through a Proxy-Call Session Control Function (P-CSCF) and a Serving-CSCF (S-CSCF);
identifying a request to initiate an IMS communication session through the IMS network with a second electronic device based, at least in part, on the non-IMS SIP message;
identifying the received non-IMS SIP message for authentication information associated with the first electronic device and a destination address associated with a second electronic device;
validating the first electronic device based, at least in part, on the identified authentication information;
initiating the IMS communication session with the second electronic device in response to the request;
receiving, from the first electronic device, a first SIP message through an IMS network;
associating the received first SIP message with the initiated IMS communication session;
transmitting, to the second electronic device, a second SIP message that includes the destination address; and
initiating a SIP dialog with an IMS core network during the initiated IMS communication session.

11. The computer-readable medium of claim 10, wherein the operations further comprising executing instructions to identify a Session Description Protocol (SDP) offer based, at least in part, on the received non-IMS SIP message, storing the identified SDP offer to a memory communicably coupled to at least one hardware processor, and wherein the SIP invite message further includes the SDP offer.

12. The computer-readable medium of claim 10, wherein the operations further comprising:

identifying a Session Description Protocol (SDP) offer based, at least in part, on the received non-IMS SIP message;

receiving a first SIP response from the second electronic device;

identifying, the first SIP response for an SDP answer;

storing the SDP offer and the SDP answer to a memory communicably coupled to at least one hardware processor; and transmitting, to the first electronic device, a second SIP response that includes information associated with the SDP answer for resource reservation.

13. The computer-readable medium of claim 12, wherein the operations further comprising:

determining a first codec based, at least in part, on the SDP offer;

determining a second codec based, at least in part, on the SDP answer, wherein the second codec is different from the determined first codec;

transcoding the first codec to the second codec for an SIP message transmitted from the first electronic device to the second electronic device; and transcoding the second codec to the first codec for an SIP message transmitted from the second electronic device to the first electronic device.

* * * * *